United States Patent [19]
Tedeschi et al.

[11] Patent Number: 4,606,224
[45] Date of Patent: Aug. 19, 1986

[54] DECELERATION BASED COMPRESSION TEST

[75] Inventors: Rinaldo R. Tedeschi, Newington, Conn.; Robert A. Edwards, Woodstock, England

[73] Assignee: United Technologies Corporation, Hartford, Conn.

[21] Appl. No.: 718,760

[22] Filed: Apr. 1, 1985

[51] Int. Cl.⁴ ........................................... G01M 15/00
[52] U.S. Cl. ................................................... 73/117.3
[58] Field of Search ...................... 73/117.3, 116, 115; 364/431.03, 551

[56] References Cited
U.S. PATENT DOCUMENTS
4,292,670  9/1981  Reid et al. ...................... 73/116 X FOREIGN PATENT DOCUMENTS
2812545  10/1979  Fed. Rep. of Germany ........ 73/116

Primary Examiner—Jerry W. Myracle

[57] ABSTRACT

Compression is measured in an internal combustion engine by sensing the deceleration in sub-cyclic engine speed resulting from each cylinder's compression stroke while the engine is decelerating without fuel to the cylinders and without engine load.

1 Claim, 13 Drawing Figures

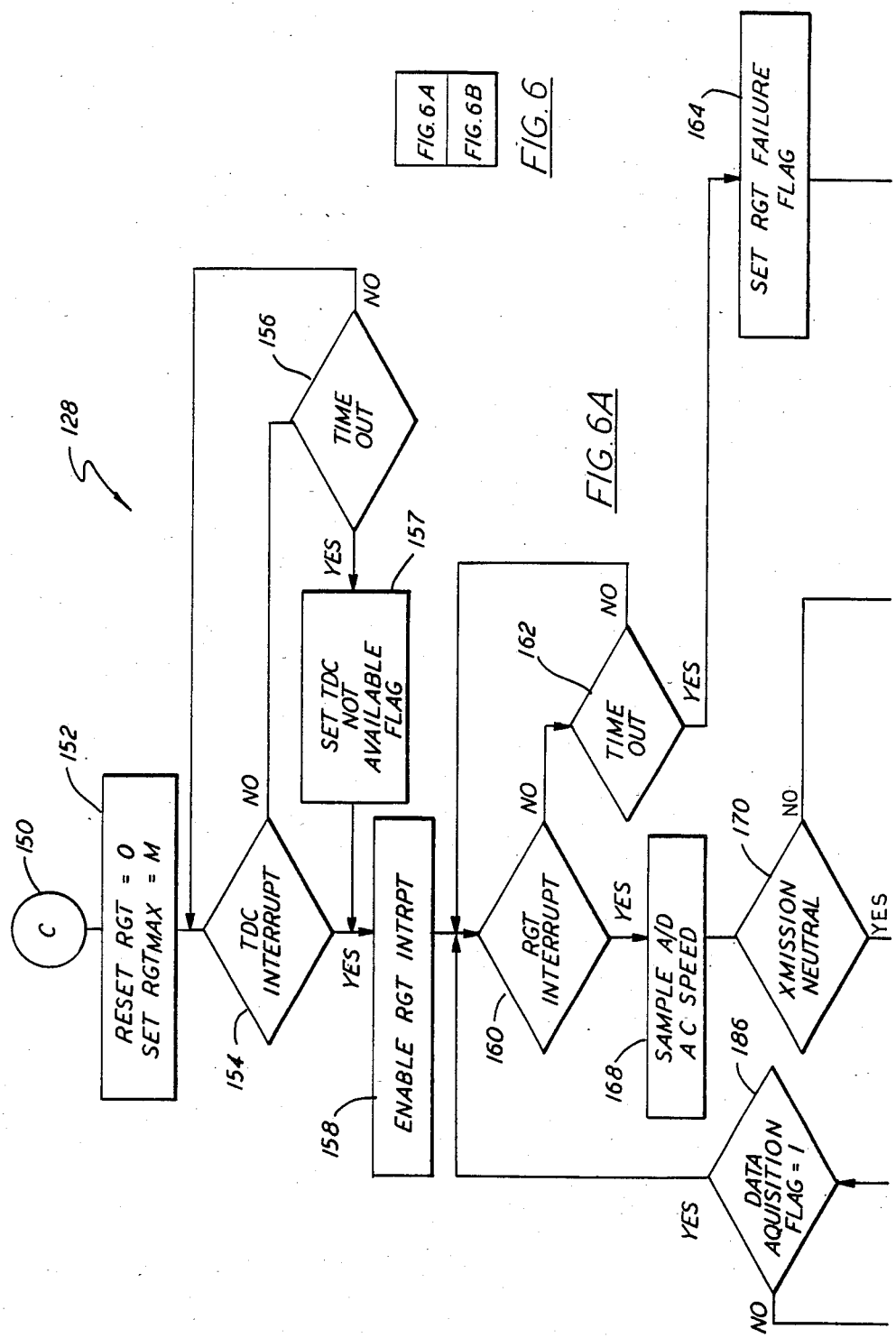

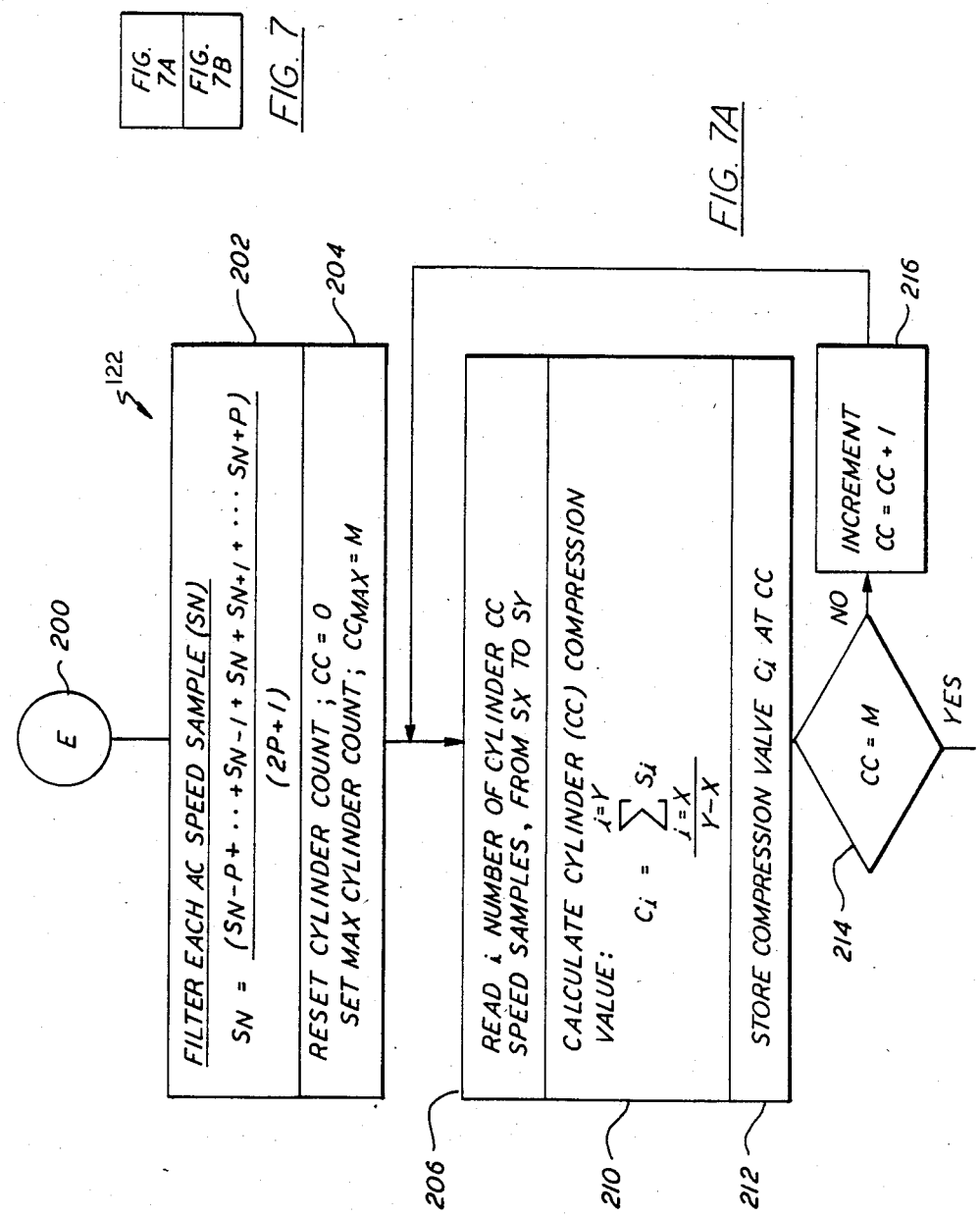

DECELERATION BASED COMPRESSION TEST

TECHNICAL FIELD

This invention relates to internal combustion (IC) engines, and more particularly to the measurement of cylinder compression in a vehicle mounted IC engine.

BACKGROUND ART

The use of electronics in measuring performance of IC engines is well known. One such performance measurement is relative compression which provides an indication of the engine's balance between cylinders. The prior art methods for electronically measuring relative compression in vehicle mounted engines involve cranking the engine without ignition and measuring the change in engine sub-cyclic speed due to each cylinder's compression stroke. Two such prior methods are disclosed in commonly assigned U.S. Pats. Nos. 4,050,296 to Benedict, entitled RELATIVE COMPRESSION OF AN INTERNAL COMBUSTION ENGINE, and 4,348,893 to Hendrix et al, entitled RELATIVE COMPRESSION OF AN ASYMMETRIC INTERNAL COMBUSTION ENGINE.

In Benedict the engine is cranked without ignition and the peak to peak excursion in starter current occurring over each cylinder sub-cycle is measured and compared with an average peak to peak magnitude obtained for all cylinders. The peak to value of interest covers the cylinder compression and expansion strokes.

In the patent to Hendrix et al an asymmetric IC engine is similiarly cranked without ignition and the peak to peak change in sub-cyclic crankshaft speed is measured, rather than starter current. Speed is measured by sensing the rate of rotation of the engine's ring gear teeth past a fixed point. Hendrix et al alternates between measuring the maximum to minimum and minimum to maximum changes in crankshaft speed so as to measure the compression stroke for left bank cylinders and the expansion stroke for the right bank cylinders.

Each of these methods are limited in both implementation and accuracy. Since each involve measurement of engine compression without ignition, neither may be performed during normal vehicle operation. Instead the tests are relegated to garage procedures, i.e. maintenance tests performed in a repair facility. Similiarly, compression measurement without engine operation means that the compression data is not taken with respect to optimum engine conditions. It is taken at cranking rather than idle speeds. This further results in poor correlation of test data since other engine performance characteristics may dominate, such as faulty starter problems.

DISCLOSURE OF INVENTION

One object of the present invention is to provide a method for measuring relative compression in vehicle mounted engines during normal engine operation. Another object is to provide both method and apparatus for measuring engne compression during normal vehicle operation.

According to the present invention, compression is measured by sensing the deceleration in sub-cyclic speed resulting from the compression of each cylinder while the engine is decelerating without output power. In further accord with the present invention, sub-cyclic speed measurements are made during each cylinder compression stroke while the engine is decelerating with ignition but without fuel to the cylinders, and with only parasitic loading by the engine's components. In still further accord with the present invention, engine deceleration is initiated by releasing the accelerator pedal and placing the vehicle transmission in neutral at a cruise speed sufficiently higher than idle so that continued deceleration consumes any residual fuel in the cylinders prior to achieving a test speed below cruise and above idle; the sub-cyclic speed data being measured in the deceleration interval between the test speed and idle.

In the present invention individual cylinder compression value is obtained by integrating the area under the curve of the measured sub-cyclic speed values associated with the compression and expansion strokes of each cylinder. Without fuel delivery to the cylinders there is no engine output power in the expansion stroke. Instead, the engine is freewheeling in response to the engine's stored inertial energy. Each compression stroke loads the engine and provides a deceleration increment. The amount of deceleration is directly proportional to the level of cylinder compression. The higher the cylinder compression the greater the sub-cyclic speed deceleration associated with the cylinder.

The present invention is intended for onboard motor vehicle mounting to test engine compression periodically during normal vehicle operation. A vehicle operator places the transmission in neutral (or simply depresses the clutch pedal) and decelerates the engine by releasing the accelerator. The data acquisition portion of the test is complete within seconds, ideally less than one second, and the operator can restore the vehicle to normal operation.

These and other objects, features and advantages of the present invention will become more apparent in light of the following detailed description of a best mode embodiment thereof, as illustrated in the accompanying drawing.

BEST MODE FOR CARRYING OUT THE INVENTION

Figure 1A:
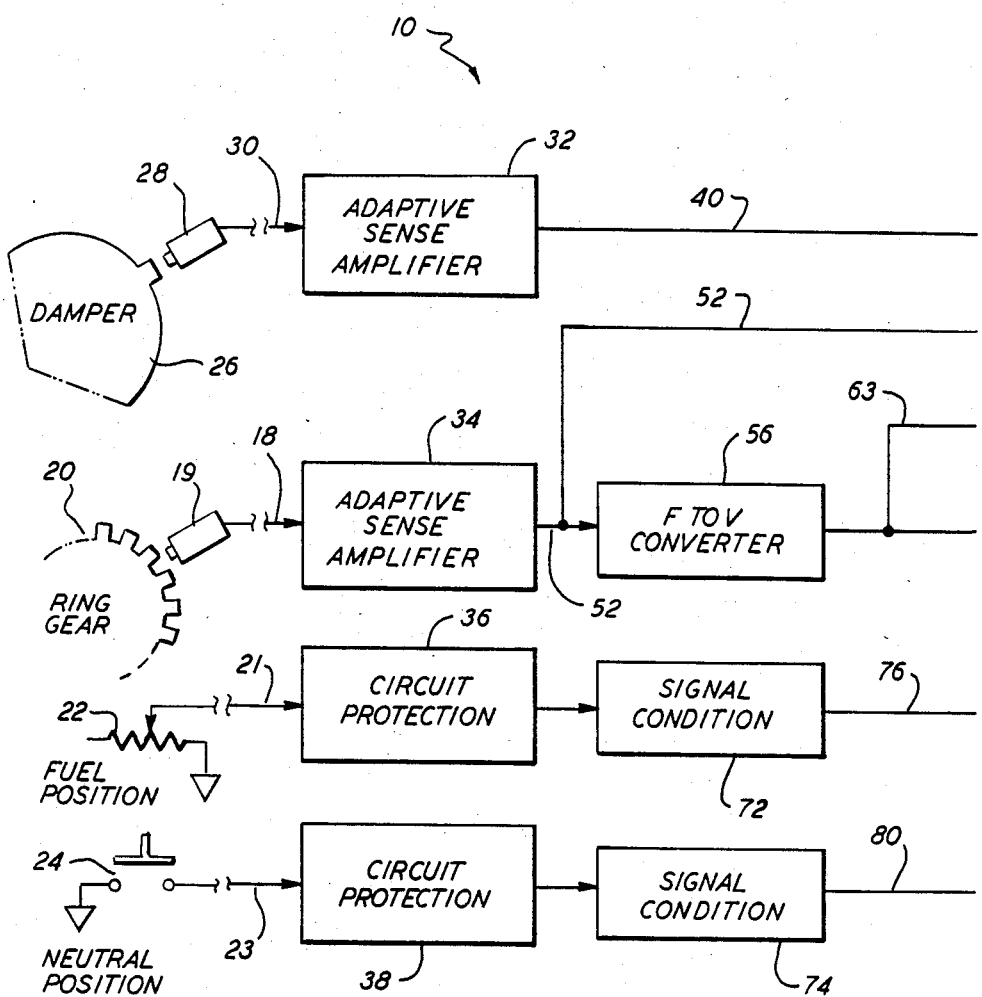
FIG. 1 including parts 1A and 1B is a simplified block diagram illustration of a best mode embodiment of apparatus used to perform the compression test of the present invention.
Figure 1:
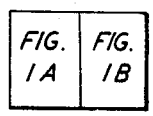
Figure 1B:
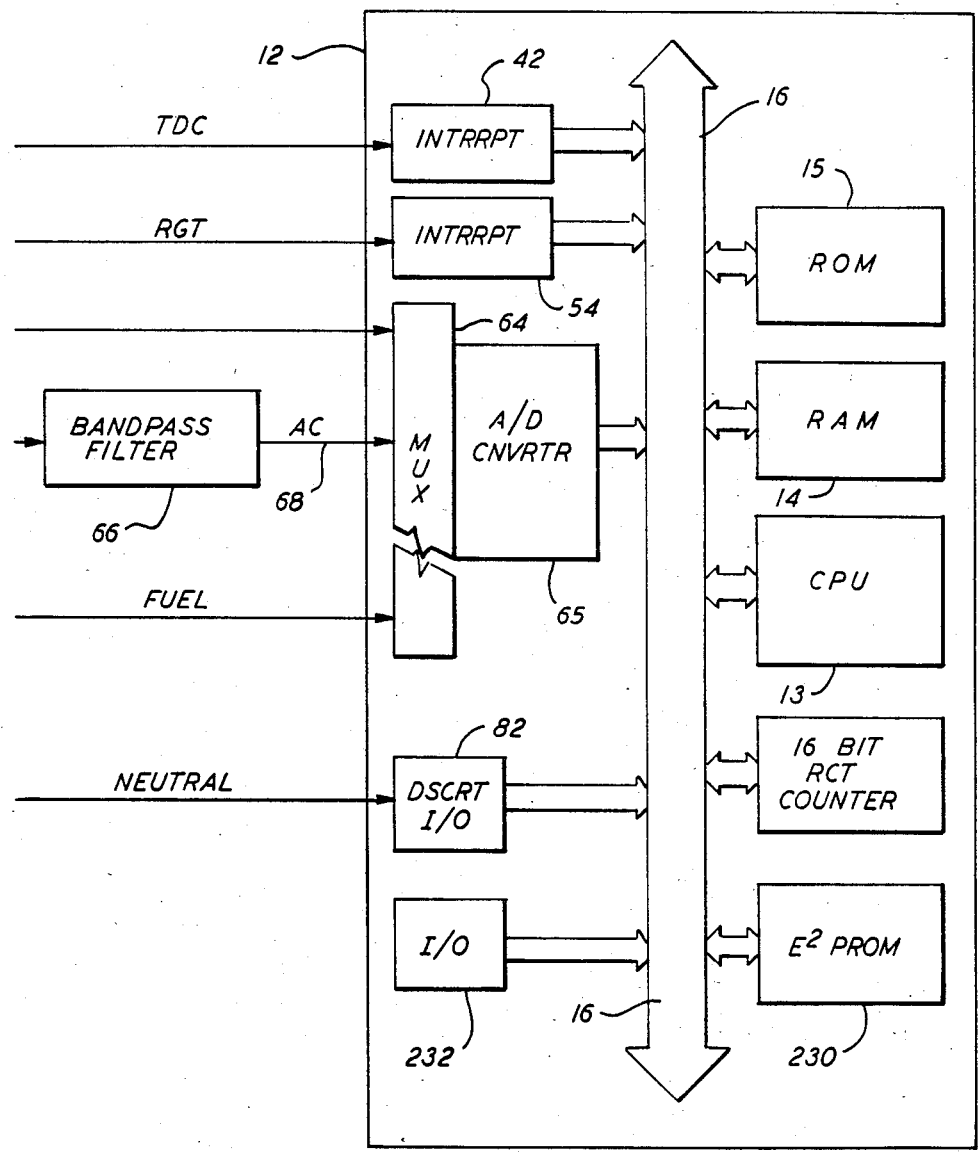

FIG. 1 illustrates apparatus 10 which may be mounted onboard the vehicle to perform the present engine compression test. The apparatus includes a known type signal processor 12, preferably an eight bit microprocessor such as the Zilog Z80, Intel 8080, or NEC 7810 models. The signal processor includes a central processing unit (CPU) 13 with RAM and ROM memories 14, 15 interconnected with the CPU through an address/control/data bus 16. The processor further includes input/output (I/O) interfaces and special function circuitry, all of which is described in detail hereinafter. Since the compression measurement test is a low duty cycle task the apparatus may time share use of a processor with a vehicle mounted data acquisition unit (DAU) or electronic engine control (EEC), if available. Neither are shown in FIG. 1.

The apparatus receives sensed engine data in the form of an engine ring gear teeth (RGT) signal, a cylinder fuel delivery signal, and a transmission neutral position signal. The RGT signal is received on line 18 from an analog proximity sensor 19 which senses rotation of the engine's ring gear teeth 20. The proximity sensor is a known type, such as an Electro Corp. RGT Model 3010-AN. The cylinder fuel delivery signal is an analog signal received on line 21 from the engine fuel rack sensor 22. The fuel sensor may be a potentiometer which changes linearly with fuel delivery of the injection pump, or a flow/no flow discrete, since only the position of zero fuel delivery is required. The transmission signal is a discrete signal received on line 23 from a discrete transmission sensor 24, which typically provides a switch closure to vehicle common when the transmission is in neutral.

In the best mode embodiment the apparatus also receives a crankshaft index (CI) signal marking a referenced crankshaft position, such as the top dead center (TDC) position of the engine No. 1 cylinder. The engine's TDC marker on the engine damper 26 is sensed by a proximity sensor 28, similar to sensor 19, which provides the sensed CI signal on line 30. The CI signal is used to map cylinder stroke versus crankshaft angle ($\phi_c$) in each engine cycle. The tooth intervals of the RGT signal mark the crankshaft angle. A ring gear with 120 teeth provides a 3° of crankshaft resolution.

The CI and RGT signals are received by known type variable gain, adaptive sense amplifiers 32, 34, such as the National Semiconductor model NSC 1815. The amplifiers provide an exact edge trigger output at the zero cross of the magnetic pickup signals. The amplifier gain is adaptive to the input signal amplitude. The sensed fuel and transmission signals are each received through circuit protection circuitry 36, 38, which protect the apparatus from overvoltage or reverse polarity conditions which may arise due to failure, or mis-connection of the fuel and transmission sensors.

Figure 2:
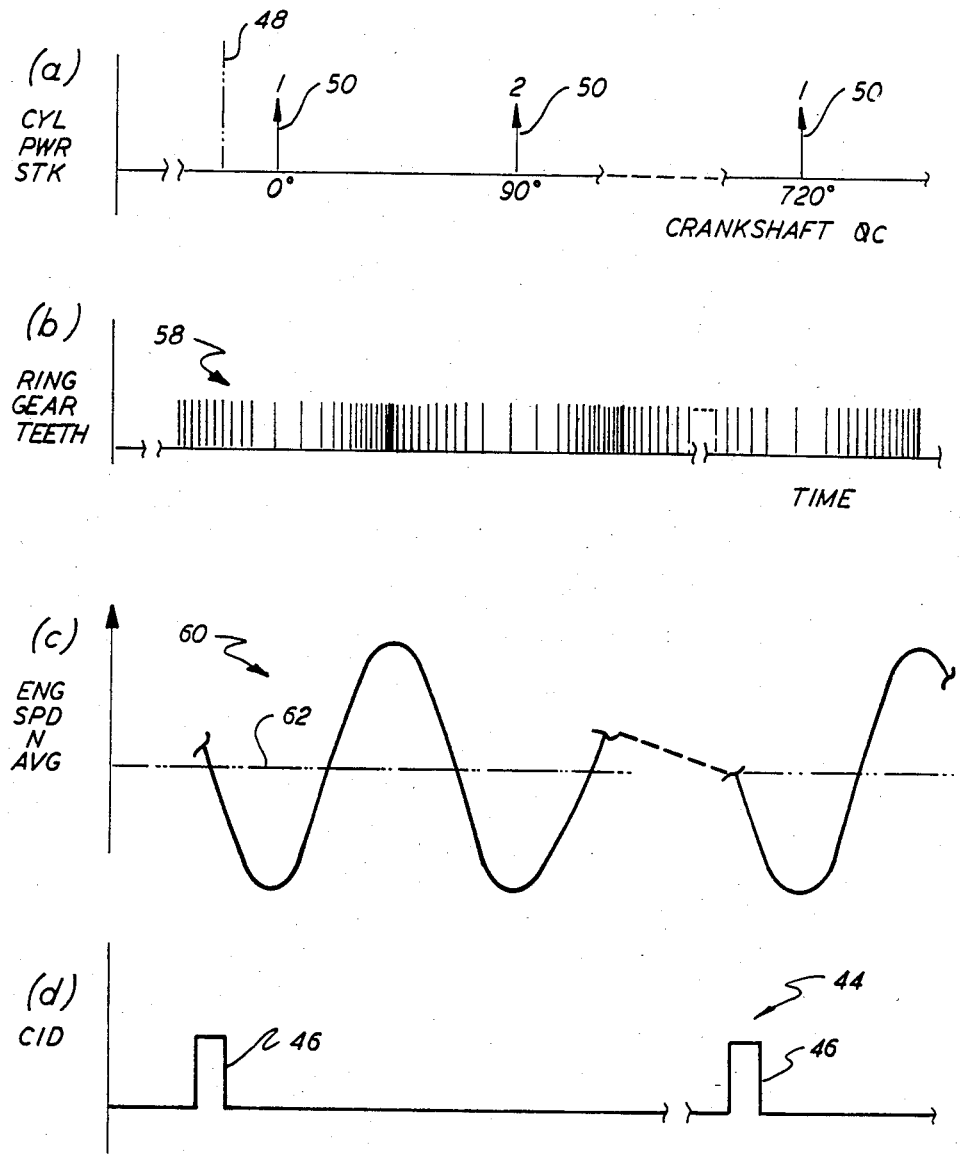
FIG. 2 is an illustration of waveforms used in the description of operation of the embodiment of FIG. 1.

The signal output of amplifier 32, on line 40, is a cylinder identification (CID) signal which is presented to interrupt input 42 of the signal processor 12. FIG. 2, illustration (d) shows the CID waveform 44 as a periodic pulse 46 occurring in each crankshaft revolution, at a specified crankshaft angle. In illustration (a) the phantom line 48 approximates the location of the sensed TDC with respect to the power stroke TDC 50 of cylinder 1. Illustration (a) assumes an eight cylinder engine with 90° cam spacing.

The amplifier 34 provides the conditioned RGT signal on line 52 to interrupt input 54 of the processor 12 and to a frequency-to-voltage (F/V) converter 56. Since the ring gear teeth are evenly spaced around the circumference of the gear and the rotational speed of the ring gear varies with sub-cyclic engine speed, the RGT signal on line 52 is frequency modulated, as shown by waveform 58 of FIG. 2, illustration (b).

Tooth pulse density per unit time varies with sub-cyclic speed. Comparing illustrations (a), (b) it is noted that pulse density is minimal at the lower speed cylinder top dead center positions and is maximum at the higher speed occurring approximately midway in the expansion stroke.

The converter 56 converts RGT frequency to a sinusoidal amplitude voltage signal, as shown by waveform 60 of FIG. 2, illustration (c). The sinusoidal amplitude represents the instantaneous sub-cyclic speed about an average engine speed ($N_{AVG}$) 62. Engine speed increases with piston expansion following compression up to a peak speed at a crankshaft angle approximately midway between adjacent cylinder TDC. Following this peak, the succeeding cylinder's compression stroke decreases speed to a minimum at the cylinder's TDC position.

The sinusoid signal is presented on line 63 through a multiplexar MUX 64 to the processor's analog to digital (A/D) converter 65, and to a band-pass filter 66 (FIG. 1). The filter removes the DC (average speed) value, and is preferably an active filter with an approximate 20 to 200 Hz band-pass. This represents the range of the sub-cyclic speed component frequency, i.e. the A.C. component. The filtered sinusoid is presented on line 68 to a second input of MUX 64. The fuel and transmission signals are conditioned in signal conditioning circuitry 72, 74. The conditioned analog fuel signal is presented on line 76 to a third input of the MUX 64. The transmission signal is presented on line 80 to a discrete input/output (I/O) interface 82 of the processor. In the present invention compression is measured as the change in sub-cyclic speed produced by each cylinder over an interval in which the engine is not producing output power. This occurs during engine deceleration with prerequisite boundary conditions. These include the following.

(1) There is no fuel delivery to the cylinders. The fuel is shut off by releasing the accelerator, allowing the engine to decelerate toward idle. This must occur at a "fuel shutoff" RPM which is sufficiently higher than idle so that continued deceleration consumes all residual fuel in the injectors prior to achieving to a lower "test speed" RPM above idle. In FIG. 1, the processor CPU 13 receives sensed fuel magnitude and RGT speed from A/D converter 65. The RGT tooth frequency is a machine equivalent of the actual engine RPM.

(2) All engine parasitic loads large enough to affect the deceleration characteristic, are removed. This requires that the vehicle transmission be in neutral. The sensed transmission information is received through discrete I/O 82.

(3) The test speed RPM must be a speed at which the sub-cyclic (AC) amplitude is large enough for accurate measurement. This is on the order of 1000 RPM.

(4) The engine must continue to decelerate without fuel and without load while the speed data is being acquired. Typically this is two revolutions of the engine, covering a 120 RPM drop in speed.

The data acquisition and quantitative analysis routines are described in detail hereinafter with respect to the flowcharts of FIGS. 4 through 7. The acquired data is analyzed by performing a line integration of the speed samples over some or all of the sampled sub-cyclic speed values occurring between the compression and expansion strokes. With the CID signal at interrupt 42 the processor can identify each cylinder by their crankshaft position relative to the TDC of the reference (No.

1) cylinder. This allows sub-cyclic speed changes to be uniquely associated with a given cylinder, so as to provide specific cylinder fault reporting in addition to relative compression.

Figure 3:
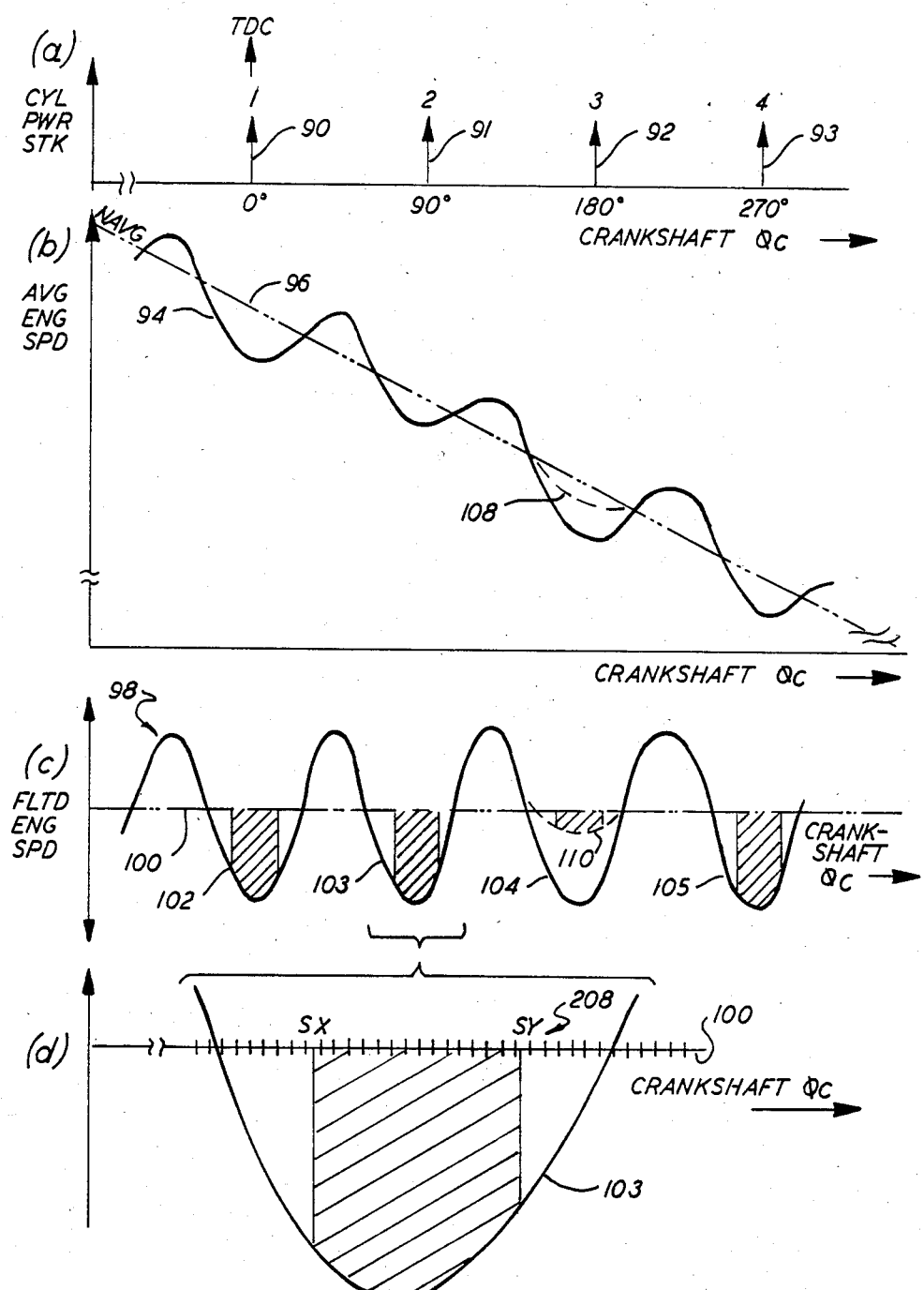
FIG. 3 is another set of waveform illustrations used in the description of the present invention.

FIG. 3, illustration (a) represents the TDC positions 90–93 of a portion of the engine cylinders. As stated, it is assumed that the engine has eight cylinders with 90° cam spacing. The cylinder TDC locations are numbered 1–4 with respect to firing order from the CID. Illustration (b) shows the sub-cyclic deceleration speed profile 94 of the speed signal on line 63 at the output of the F/V converter 56 (FIG. 1). The waveform is centered about average engine speed ($N_{AVG}$) 96. Following band-pass filtering the AC waveform on line 68 is shown by waveform 98 in illustration (c). The filtered waveform represents the sub-cyclic speed changes resulting from the intake, compression, expansion, and exhaust strokes of each cylinder. The negative component of the sinusoid below the zero axis 100 corresponds to the deceleration produced by the cylinder compression stroke. Each cylinder TDC (90–93) corresponds more or less to the centers of each of the negative sinusoidal components 102–105 of the filtered waveform 98.

The area of the negative components of the filtered speed signal on line 68 represent the compression capability of each cylinder. Cylinders with higher compression produce more deceleration of the engine and more area beneath the curve. As compression decreases so does the negative component area. The extreme of zero compression results in very little deceleration during that cylinder's sub-cycle. The dashed lines 108 in illustration (b) and 110 in illustration (c) represent a reduced negative component area due to low cylinder compression.

Figure 4:
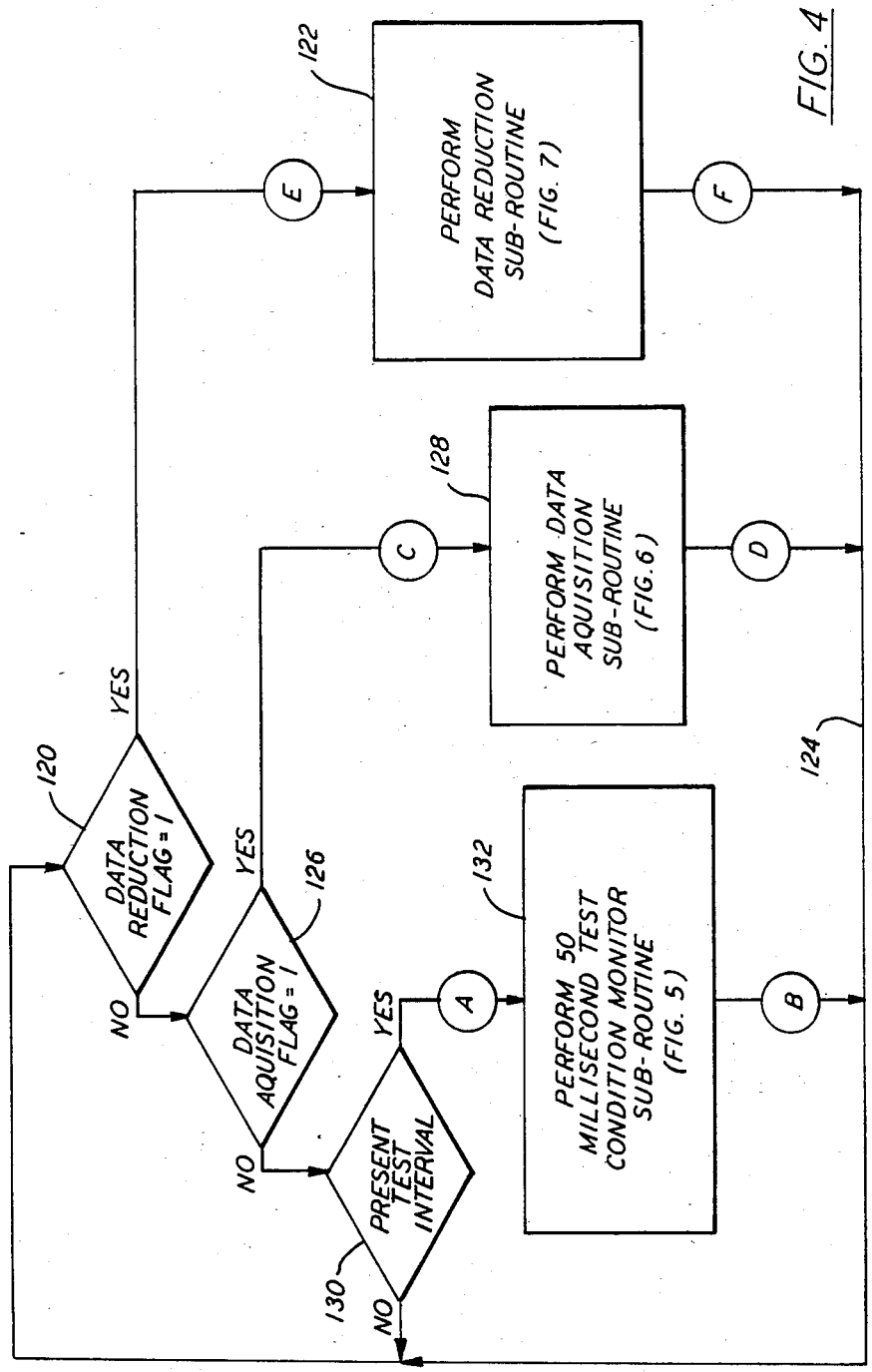
FIG. 4 is a flowchart diagram illustrating the steps performed by the embodiment of FIG. 1 in the compression test of the present invention.

FIG. 4 is a flowchart of the compression test routine of the present invention. As described with respect to FIGS. 5–7, the compression test involves three subroutines. These include: (i) a test condition subroutine, (ii) a data acquisition subroutine, and (iii) a data reduction subroutine. The processor 12 loops through the flowchart, beginning at decision 120 which determines if the DATA REDUCTION FLAG is set to one. If YES, the processor executes the data reduction subroutine 122 and loops back through 124 to the beginning. If NO, decision 126 determines if the DATA ACQUISITION FLAG is set to one (acquire data). If YES, the processor performs the data acquisition subroutine 128 and branches back. If NO, decision 130 determines if a PRESENT TEST INTERVAL exists, i.e. if a compression test can be run. If YES, the processor performs a test condition monitor routine 132 to determine the existence of prerequisite condition. If NO, the processor again branches back.

Figure 5:
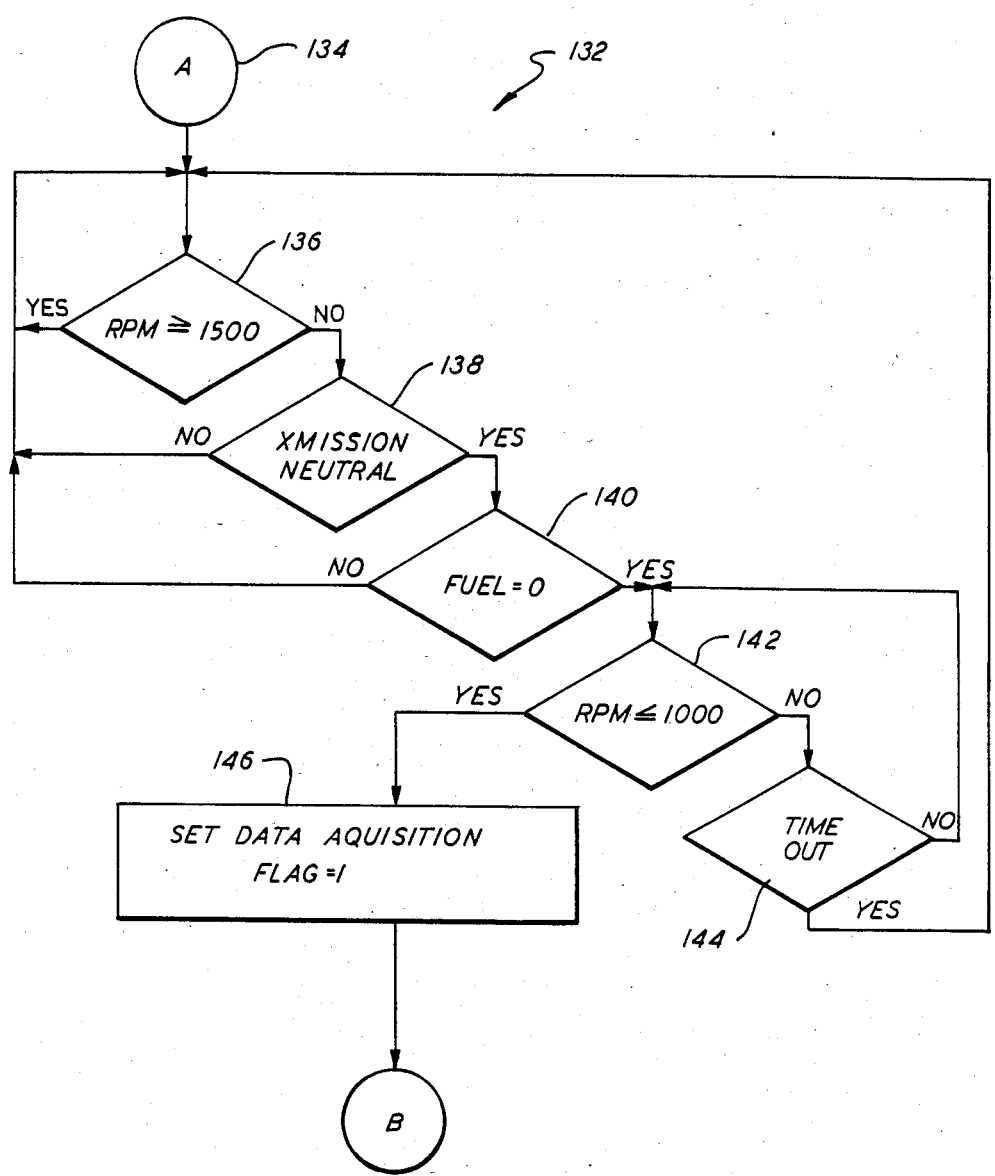
FIG. 5 is a flowchart diagram illustrating a subroutine of the flowchart of FIG. 4.

FIG. 5 illustrates the steps performed by the test condition monitor routine 132. The processor enters the subroutine at 134 and decision 136 determines if the engine speed is greater than the selected cruise speed at the beginning of the deceleration profile. In the example the limit is 1500 RPM. If YES, the engine is not within the desired deceleration profile and the processor branches back to the beginning 134. If NO, decision 138 next determines if the vehicle transmission is in neutral (disengaged). If NO, the test cannot be run and the processor branches to 134. If YES, decision 140 determines if there is zero fuel. If NO, branch to 134; if YES, the test prerequisites have been met and the processor goes on to decision 142.

Decision 142 determines if the engine speed has decelerated to the selected test threshold speed. This is a speed sufficiently higher than idle so that the engine will continue to decelerate without fuel during data acquisition and a speed sufficiently low so as to maximize the sub-cyclic speed signal amplitude (FIG. 3, illustration (c)). For an engine idle of 600 RPM, a selected test threshold speed may be 1000 RPM, allowing at least a 300 RPM band over which data is acquired. Therefore, decision 142 determines if engine speed is less than or equal to the threshold of 1000 RPM. If NO, decision 144 determines if the time out has occurred, i.e., maximum routine time.

If time out has ocurred, i.e., a YES answer, the processor branches back to the beginning 134. If NO, the processor branches back to decision 142 to again check for the presence of the threshold speed. Following the presence of the threshold speed with a YES to decision 142, instructions 146 set the DATA ACQUISITION FLAG=1. This enables the data acquisition routine 128 (FIGS. 4, 6).

Figure 6B:
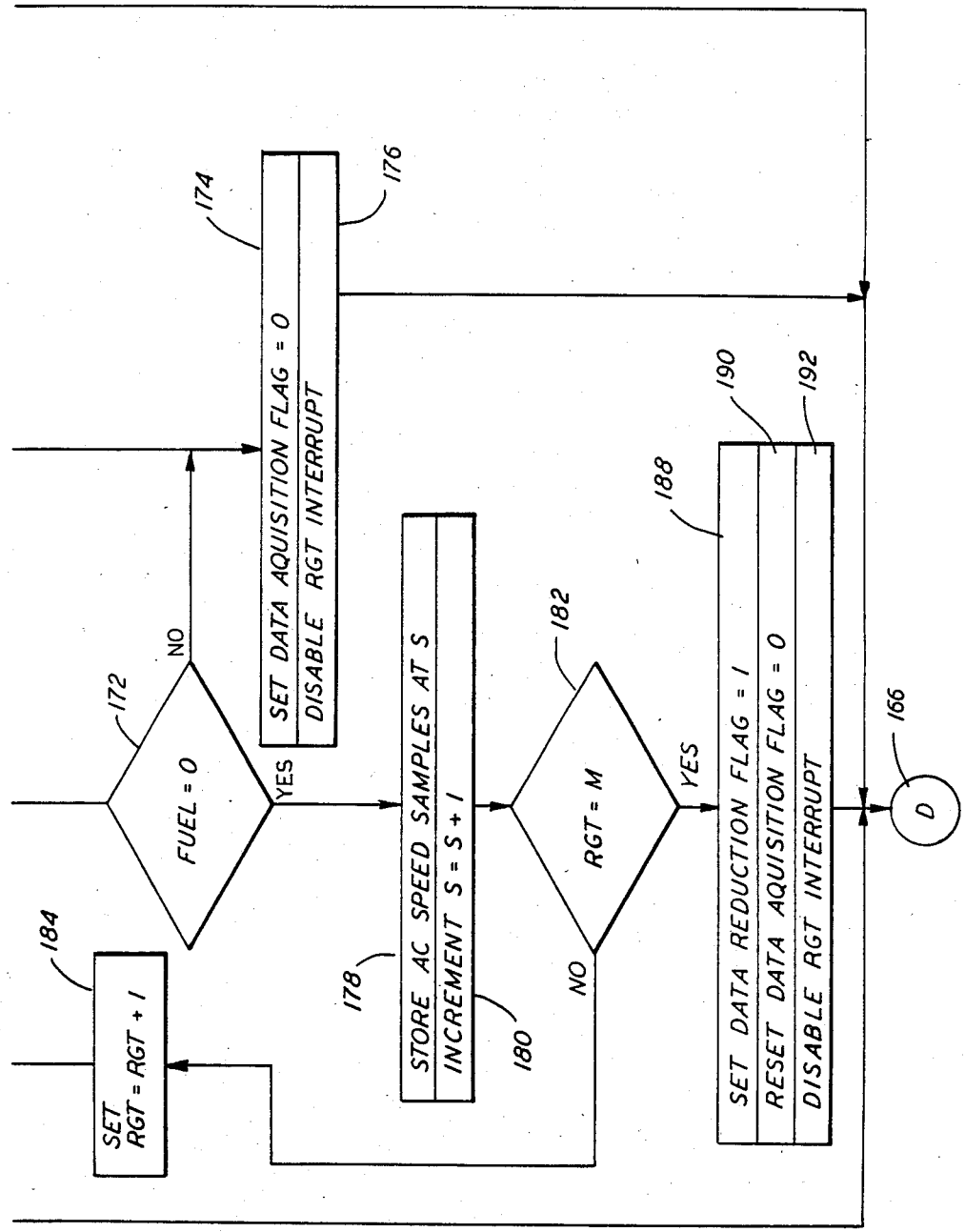
FIG. 6 including parts 6A and 6B is a flowchart diagram illustrating another subroutine of the flowchart diagram of FIG. 4.

With the DATA ACQUISITION FLAG=1 the answer to decision 126 (FIG. 4) is YES, and the processor on the next pass executes the DATA ACQUISITION subroutine 128 of FIG. 6. The data acquisition routine is interrupt driven; initiated by each RGT interrupt. If the optional TDC feature is present, the RGT interrupt is enabled after the first TDC is recorded under the engine speed test threshold (1000 RPM). The sub-cyclic speed value is recorded from the output of the A/D converter and stored in memory. The prerequisite test conditions of transmission neutral and zero fuel delivery are tested and if conditions are not met data acquisition is aborted. If all the conditions are maintained the RGT interrupts are counted to determine if sufficient data points have been recorded, i.e. RGT=M. If so, the RGT interrupt is disabled and the processor performs the data reduction routine (122, FIG. 4). A new data acquisition routine will not begin until data reduction has been completed.

The data acquisition routine begins at 150, and instructions 152 reset the processor RGT count to zero and the maximum count $RGT_{MAX}$ to M (the maximum count value over the engine cycle). Decision 154 determines if there is a present TDC interrupt (42, FIG. 1). If NO, decision 156 determines if test time out has occurred and if NO, the processor enters a wait loop to see if TDC occurs. If TDC does not occur, either due to failure or lack of a CID signal input, data acquisition may still continue since the presence of TDC merely ensures accurate cylinder identification. It is not essential to relative compression measurement. Therefore, following a time out, or a TDC interrupt, instructions 158 enable the processor's RGT interrupt (54, FIG. 1). This allows each RGT signal pulse to interrupt the processor.

Decision 160 determines if an RGT interrupt is present. If NO, decision 162 determines if there is a test time out. If no time out, the processor branches back to 160 to again check for an interrupt. If a time out has occurred, a YES to decision 162, instructions 164 set an RGT FAILURE FLAG. The processor then exits the routine at 166 and branches back to the beginning of the FIG. 4 flowchart. Following a YES to decision 160 (RGT interrupt) instructions 168 read the A/D converter 65 (FIG. 1) for the corresponding sub-cyclic speed sample. Following instructions 168, decisions 170, 172 test for the presence of neutral transmission and zero fuel states, respectively. If there is a NO to either, instructions 174 set the DATA ACQUISITION FLAG to zero and instructions 176 disable the RGT interrupt. The processor exits at 166.

If decision 172 is a YES, instructions 178 store the sub-cyclic (AC) speed sample at memory location S and instructions 180 increment the memory address counter. Decision 182 next determines if the RGT count is equal to the maximum (M). If NO, instructions 184 increment the RGT count and decision 186 determines if the DATA ACQUISITION FLAG is still set to one. If NO, the processor exits at 166; if YES it branches back to decision 160 to await the next RGT interrupt. In the event of a YES to decision 182, instructions 188 set the DATA REDUCTION FLAG to one. Instructions 190 reset the DATA ACQUISITION FLAG to zero and instructions 192 disable the RGT interrupt. The processor exits at 166.

Figure 7B:
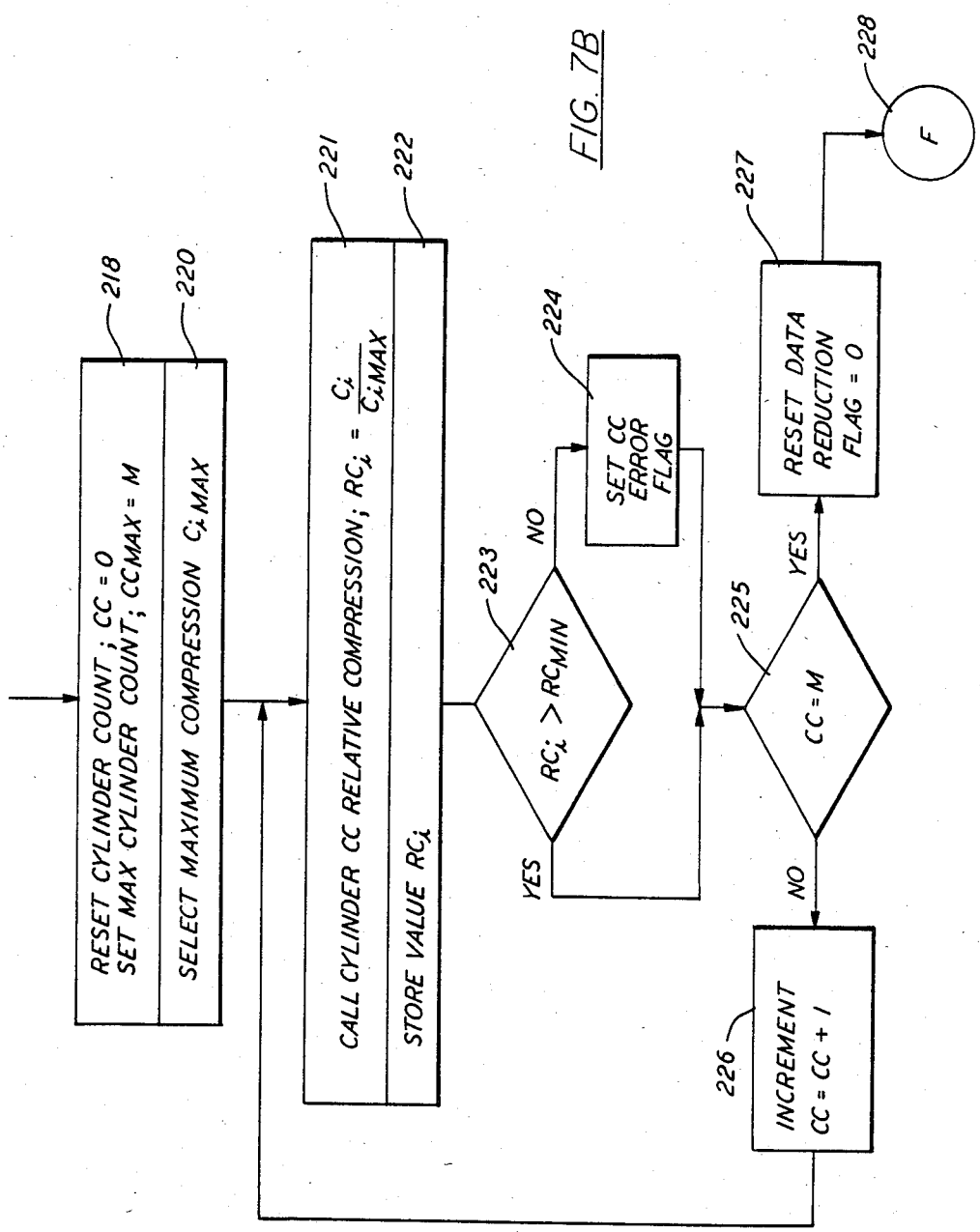
FIG. 7 including parts 7A and 7B is a flowchart diagram illustrating yet another subroutine of the flowchart diagram of FIG. 4.

With the DATA REDUCTION FLAG set to ONE, the processor performs data reduction of the stored samples. FIG. 7 details the DATA REDUCTION subroutine 122 of FIG. 4. The processor enters the subroutine at 200 and instructions 202 require signal filtering of each of the sub-cyclic AC speed samples ($S_N$) stored in memory. The signal filtering algorithm is a known type which filters each speed sample, e.g. sample ($S_N$) over the total number of speed values obtained (2P) in the engine cycle. Instructions 204 next reset the cylinder counter to zero (CC=0) and set the maximum cylinder count value ($CC_{MAX}=M$). Instructions 206 read the number of speed samples taken for a given cylinder.

The number of samples is based on the particular engine. FIG. 3, illustration (d) is an expanded scale illustration of the negative signal component 103 of waveform 98 illustration (c). For the purposes of description the RGT interrupts 208 occuring in the interval of signal component 103 are shown marked on the zero axis 100. Assuming a 120 tooth ring gear with 3° per tooth of crankshaft position resolution, and with 90° cam spacing (8 cylinder engine) between cylinder TDC, the negative speed component is marked with approximately 30 RGT interrupts. This means there are 30 speed samples taken along the curve. It is not necessary, however, that all of the samples be used to calculate the line integral value. A smaller interval may be selected, as illustrated with the $S_X$ to $S_Y$ boundaries. The more narrow the interval taken the higher the degree of isolation of the present cylinder from the adjacent cylinders in the firing order.

Referring to FIG. 7, instructions 206 read the selected number of samples to be used for cylinder CC; those from $S_X$ to $S_Y$. Instructions 210 calculate the line integral between the $S_X$ and $S_Y$ limits to determine cylinder compression $C_i$. Instructions 212 store the $C_i$ value at cylinder address location CC in memory. Decision 214 determines if the cylinder address count is equal to the maximum M. If NO, instructions 216 increment the CC count and the processor branches back to instructions 206. If YES, instructions 218 reset the CC count to zero. Instructions 220-227 calculate the engine's relative compression $RC_i$ values as the ratio of each cylinder's calculated compression value divided by the maximum calculated compression value for any of the cylinders.

Instructions 220 select the maximum compression value from memory and instructions 221 calculate the cylinder ratio of its $C_i$ value to the maximum $C_{iMAX}$ value. Instructions 222 store the relative compression value $RC_i$. Decision 223 determines if the calculated $RC_i$ value is greater than a minimum. If NO, instructions 224 set a CC ERR FLAG, identifying a low compression cylinder. Following instructions 224 or a YES to decision 223, decision 225 determines if the cylinder count is equal to the maximum. If NO, instructions 226 increment the CC count and the processor branches back to instructions 221. If YES, instructions 227 reset the DATA REDUCTION FLAG to zero and the processor exits at 228.

The calculated relative compression values are stored in memory. Typically a selected number of the most recent values are stored in non-volatile memory, such as the $E^2$ from 230 of processor 12 (FIG. 1). The non-volatile memory may also be used to store any error flag indications, such as the setting of the RGT FAILURE FLAG (164, FIG. 6). All data stored in $E^2$ PROM may be accessed for ground read out through the processor I/O 232.

The compression test of the present invention provides a current engine performance indication. It is performed periodically during vehicle operation and the results stored for maintenance retrieval. The results may also be dashboard displayed; the display being refreshed with the results of each new compression test. Alternatively, only abnormal compression results may be displayed as a warning to the operator of abnormal engine conditions.

Although the invention has been shown and described with respect to a best mode embodiment thereof, it should be understood by those skilled in the art that various other changes, omissions, and additions in the form and detail thereof may be made therein without departing from the spirit and scope of the invention.

We claim:

1. Apparatus for measuring compression in a vehicle mounted internal combustion engine having ring gear teeth which are spaced at crankshaft intervals and which rotate at engine speed, and having an accelerator and a transmission clutch for controlling engine speed above idle and for engaging and disengaging the engine from the vehicle load, respectively, in response to operator control, the apparatus comprising:

tooth sensor means for sensing rotation of the ring gear tooth and providing a ring gear tooth (RGT) signal having periodic pulses spaced at the same crankshaft angle intervals as the teeth, and having a pulse frequency proportional to engine speed;

converter means for converting said RGT signal pulse frequency into a corresponding speed signal having an amplitude representative of the engine's sub-cyclic speed resulting from the sub-cycle intervals of the engine cylinders;

transmission sensor means; for sensing the vehicle tranmission setting and providing a transmission signal indicative of disengagement of the engine from the vehicle; and signal processing means, responsive to said RGT signal, said sub-cyclic speed signal, and said transmission signal, and including memory means for storing signals, for sampling and storing in said memory means said sub-cyclic speed signal values occurring at each RGT signal pulses during deceleration of the engine from a cruise speed to the idle speed, in the presence of said transmission signal, said processing means summing said stored sub-cyclic speed samples to calculate a deceleration increment associated with the compression interval of each cylinder and for comparing said deceleration increments of all cylinders to provide an indication of cylinder compression.

* * * * *